United States Patent [19]

Cato

[11] Patent Number: 5,229,593
[45] Date of Patent: Jul. 20, 1993

[54] APPARATUS AND METHOD FOR SAFE, FREE SPACE LASER COMMUNICATION

[75] Inventor: Robert T. Cato, Raleigh, N.C.

[73] Assignee: International Business Machines Corporation, Armonk, N.Y.

[21] Appl. No.: 773,356

[22] Filed: Oct. 8, 1991

[51] Int. Cl.$^5$ .................................................. G02B 27/00
[52] U.S. Cl. .................................. 250/205; 250/551; 359/110
[58] Field of Search ............ 250/205, 221, 551, 222.1; 359/110, 113; 340/555, 556, 557

[56] References Cited

U.S. PATENT DOCUMENTS

| | | | |
|---|---|---|---|
| 4,449,043 | 5/1984 | Husbands | 250/205 |
| 4,543,477 | 9/1985 | Doi et al. | 250/205 |
| 4,598,198 | 7/1986 | Fayfield | 250/205 |
| 4,663,520 | 5/1987 | Tanaka et al. | 250/205 |
| 4,673,795 | 6/1987 | Ortiz, Jr. | 219/121 L |
| 4,687,918 | 8/1987 | Hughes et al. | 250/205 |
| 4,812,641 | 3/1989 | Ortiz, Jr. | 250/205 |
| 4,814,628 | 3/1989 | Eichweber | 250/221 |
| 4,829,596 | 5/1989 | Baring | 359/110 |
| 4,837,428 | 6/1989 | Takagi et al. | 250/205 |
| 4,862,397 | 8/1989 | Pryor | 250/205 |
| 4,879,459 | 11/1989 | Negishi | 250/205 |
| 4,882,774 | 11/1989 | Grotzinger | 359/110 |
| 4,902,889 | 2/1990 | Sodi | 250/221 |
| 4,994,675 | 2/1991 | Levin et al. | 250/551 |
| 5,069,522 | 12/1991 | Block et al. | 359/113 |

FOREIGN PATENT DOCUMENTS

| | | | |
|---|---|---|---|
| 3314869 | 10/1984 | Fed. Rep. of Germany | 359/110 |
| 2195508 | 4/1988 | United Kingdom | 359/110 |

OTHER PUBLICATIONS

Snedaker, IBM Technical Disclosure Bulletin, Laser Shutdown and Bring-Up Procedure vol. 25, No. 2, p. 570; Jul. 1982.

Primary Examiner—David C. Nelms
Assistant Examiner—Michael Messinger
Attorney, Agent, or Firm—Bell, Seltzer, Park & Gibson

[57] ABSTRACT

A free space laser communication system operates at two power levels. The system includes a microprocessor to control the laser output beam to a safety level when the input beam indicates that the output beam is not being received at the remotely positioned terminal. If the output beam is not being received by the remotely positioned terminal, a blockage or misalignment of the beam is indicated. During normal operation when a blockage or misalignment of the beam is not detected, the output beam may be operated at a level higher than a safety limit to thereby provide enhanced communication performance.

12 Claims, 3 Drawing Sheets

APPARATUS AND METHOD FOR SAFE, FREE SPACE LASER COMMUNICATION

FIELD OF THE INVENTION

The present invention relates to communication systems, and more particularly to free space laser communication systems.

BACKGROUND OF THE INVENTION

Free space, point-to-point communication systems are used extensively in the communications field. A network of point-to-point microwave systems can carry messages across the country as part of the public switched telephone network. Despite strong competition from fiber optic based communications systems, microwave or other free space systems are often justified for shorter routes, when right-of-way for a cable system is not available, or when the high communications capacity of a fiber optic system is not needed.

Laser communication systems in particular have become increasingly popular to provide a free space communications link between two locations. Laser systems do not require extensive frequency coordination as do microwave systems in common frequency bands. Laser systems often are less expensive to install than conventional copper cable or fiber optic cable communications systems because physical installation of a cable is unnecessary. For example, a laser communication system may have application between two corporate locations in a campus environment. Each laser communication terminal may be positioned on a building rooftop or even positioned adjacent a window and aligned to operate between buildings. A communications link within a building may also be provided by a free space laser communication system. Modern office automation also typically generates large amounts of data that must often be communicated between different corporate locations. Accordingly, the demand for laser communications links is increasing.

Free space laser communication systems are considered stationary laser sources for regulatory purposes, and as such, must comply with regulatory limits established to protect the eyes of an accidental or unintended observer. An accidental observer may receive permanent damage from a high power laser beam without experiencing any pain which might forewarn the observer of the harmful exposure. In addition, the wavelengths used by laser systems are often invisible. Accordingly, standards have been put in place that establish safe limits for the power that may be transmitted by a stationary laser source, such as a laser communication terminal. This maximum permissible power limits the communication system's signal-to-noise ratio, bit rate, and/or separation distance. Accordingly, there is a great need for a free space laser communication system and method that complies with safety limits yet which has improved performance over existing systems.

Moving laser beams present less of a hazard than do stationary beams as required for a free space communication system. For example, laser scanning systems for reading bar codes produce a moving, or non-stationary, laser beam. A spinning holographic disk produces a series of facet pulses from the beam. If the facet pulses are not detected, it is assumed the holographic disk is not spinning and thus the laser beam is stationary. The holographic scanner then operates the laser at a low duty cycle until the facet pulses are again detected.

Optical fibers are often used in conjunction with high power lasers, such as for laser welding and cutting, or medical applications, and the art has developed approaches for enhancing the safety of these systems. For example, U.S. Pat. No. 4,449,043 to Husbands discloses a safety device for a high power fiber optic system which may present a hazard when an optical connector is unmated. The safety device includes a four-port optical coupler which transmits to a receiver a portion of the output power, as well as backscattered energy which is developed between the glass-to-air and air-to-glass interfaces between adjacent connectors. A comparison between the output power and the backscattered energy is used to disable the laser source when an unmated condition is detected.

U.S. Pat. No. 4,543,477 to Doi et al. discloses a safety device for a medical laser wherein reflected laser light is detected from the exit end surface of a fiber and a shutter is used to stop the laser if a breakage of the fiber is detected. Ortiz Jr., in U.S. Pat. No. 4,812,641, discloses a high power laser for material processing and includes respective photodetectors to sense the laser power exiting a power optical fiber and the laser injection power. The two power levels are compared to detect whether a break in the power transmitting fiber has occurred. U.S. Pat. No. 4,673,795, also to Ortiz Jr., discloses an interlock safety arrangement which includes an optical sensor connected to the controller for turning the laser off when the laser beam has turned on but laser energy does not reach a remote module, indicating a break in the high power transmitting optical fiber.

Other safety mechanism for high power laser systems are also known. For example, U.S. Pat. No. 4,663,520 to Tanaka et al. discloses a main shutter in the path of a laser, and a safety shutter also in the optical path for completely intercepting the laser beam in its closed position. Sensors are provided before the main shutter and the safety shutter. A detection circuit opens the safety shutter when both sensors indicate predetermined values.

It is also known to vary the intensity of a laser for other than safety reasons. For example, U.S. Pat. No. 4,879,459 to Negishi discloses an automatic power controller for a semiconductor laser used in laser printing which can stop the control process when the intensity equals a set value despite the presence of electrical noise from a corona discharge. The controller includes an optical detector in a feedback control loop to equalize the intensity of the laser to a predetermined value. U.S. Pat. No. 4,862,397 to Pryor discloses an optical detector array, such as for industrial inspection and machine guidance, that adjusts light output levels, for example, to ensure that received light levels remain above a desired value. U.S. Pat. No. 4,837,428 to Takagi et al. discloses a driving circuit for a laser diode which regulates the intensity of the laser output by a controllable input voltage from a photodetector rather than a fixed reference voltage.

As described above, the prior art is primarily directed to detecting an unsafe condition in the output laser beam from a portion of the output beam reflected back to a detector. This approach is simply not applicable to a free space laser communication system which includes two widely spaced-apart terminals. An accidental or unintended observer may cross the path of the beams between the terminals or a beam may be blocked and reflected to the observer. In either case, a hazardous laser exposure could result if the laser were operated above the existing limits established for stationary laser beams.

SUMMARY OF THE INVENTION

It is therefore an object of the present invention to provide an improved free space laser communication system and method.

It is another object of the present invention to provide a laser communication system and method which allow limits on stationary lasers to be exceeded during normal operation without presenting a safety hazard.

It is a further object of the present invention to provide a laser communication system and method which use the conventional information carrying channel and components to implement safety control of the output laser beam.

These and other objects are provided according to the present invention by a free space laser communication system which operates an output laser beam above a safety threshold until a blockage or misalignment of the beam is detected. A blockage, misalignment, or other similar condition is indicated when the beam is not being properly received at a remotely positioned terminal. When the blockage or misalignment is detected, the laser is operated below the safety threshold.

In particular, the free space laser communication system includes two spaced-apart terminals. Each terminal may be identical except for a unique terminal identification code. The laser communication system may provide a two-way free space communication link for two data processors, or may carry voice traffic, or other signals.

Each terminal includes a laser transmitter for transmitting an output laser beam to the remotely positioned terminal, and a receiver for receiving an input laser beam from the remotely positioned terminal. A detector, cooperating with the receiver, detects a blockage or misalignment of the output laser beam, based upon the received input laser beam. The input beam includes a confirmation signal modulated thereon indicating that the output laser beam is being received at the remotely positioned terminal. The detector detects a blockage or misalignment of the output laser beam responsive to an absence of the confirmation signal for a predetermined time. The absence of the confirmation signal may be caused by a blockage or misalignment of only the output beam, may be the result of a common blockage of both the input and output beams, or may be a result of a blockage of the input beam. The time may be correlated to the Class 1 exposure level versus time limits. The duty cycle of the transmitter may be reduced to thereby control the average power of the output laser beam below the low power safety level.

A safety controller, responsive to the detector, operates the laser transmitter at a duty cycle below a safety threshold when a blockage or misalignment of the output laser beam is detected to thereby protect the eyes of an accidental or unintended observer. During normal operation, when blockage or misalignment is not detected, the safety controller operates the laser transmitter above the safety threshold to thereby improve communication performance.

According to the invention, high power laser transmission will only continue when a confirmation signal is received within a predetermined period of time. If a confirmation signal is not received, a blockage or misalignment is assumed, and reduced power transmission takes place. The predetermined time period is sufficiently short so that maximum stationary exposure levels are not exceeded before high power transmission is terminated. Safe, free space laser communications are thereby provided, with improved signal-to-noise ratio, bit rate and/or separation distance.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiment set forth herein. Rather, applicant provides this embodiment so that this disclosure will be thorough and complete, and will fully convey the scope of the invention to those skilled in the art.

Figure 1:
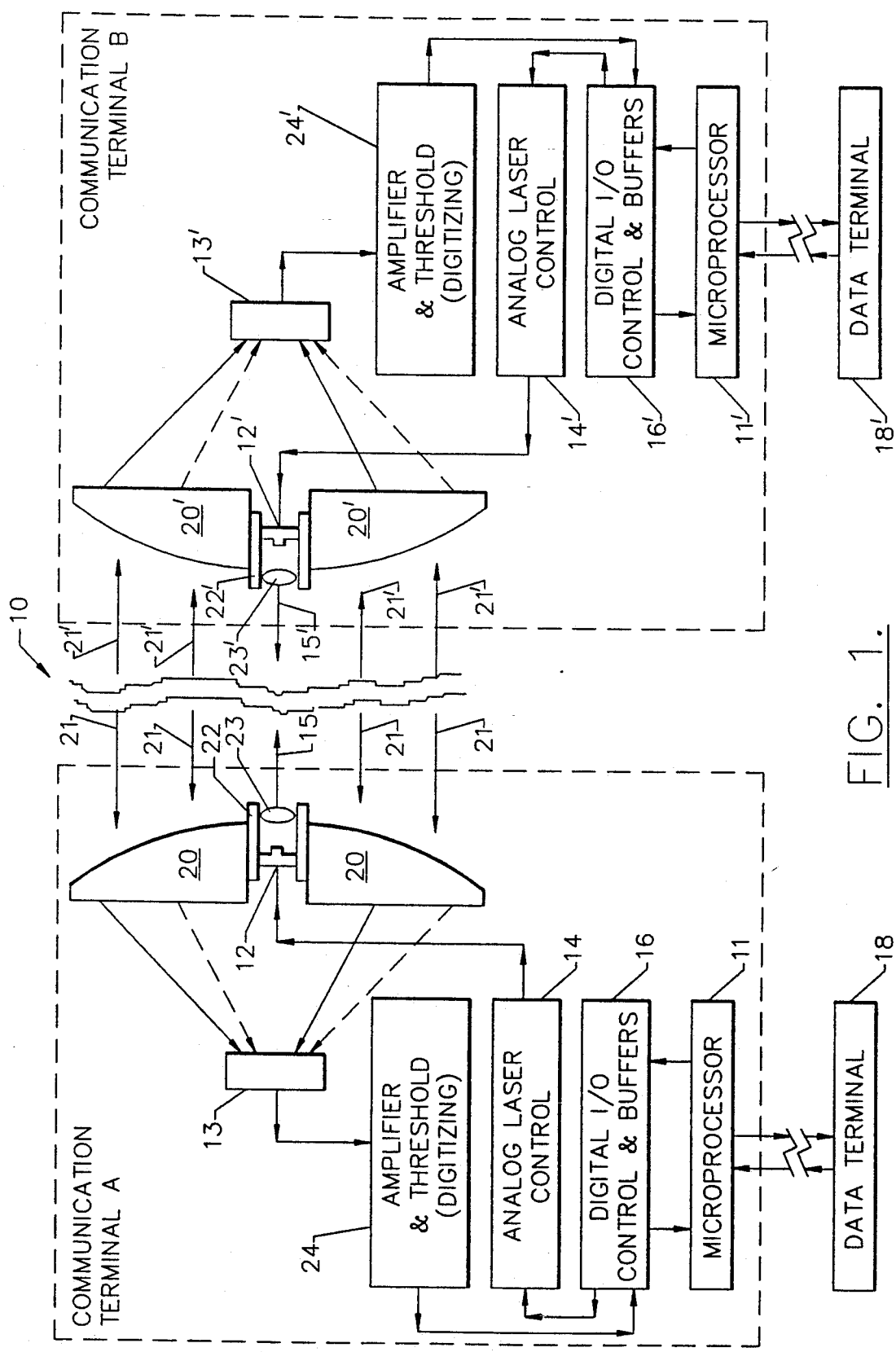
FIG. 1 is a schematic diagram of a two-way laser communication system according to the present invention.

Referring to FIG. 1, there is shown a laser communication system 10 according to the present invention including a pair of communication terminals A, B. The communication terminals A, B are separated by a free space distance which may vary depending on the desired path, expected atmospheric conditions, etc. As would be readily understood by those skilled in the art, the maximum separation distance for a free space communication system operating at a predetermined frequency is determined primarily by the desired signal-to-noise ratio and the desired information transmission rate, or bit rate.

As described in greater detail below, the laser communication system 10 according to the present invention is operable at either of two power levels. At the low power "safety" level, the output laser power is reduced to meet safety regulations for a stationary laser beam. At the high power "normal" level, the output laser power may be above the regulatory safety criteria for stationary laser sources to thereby provide a greater signal-to-noise ratio or otherwise enhance system performance.

The communication terminals A, B may preferably be the same except for a unique identifying code associated with each terminal. Accordingly, the following description is directed to terminal A with the similar elements in terminal B being indicated in FIG. 1 by prime notation. To clarify the description of input and output beams, the output laser beam 15 of terminal A becomes the input laser beam 21' of terminal B, and similarly, the output laser beam 15' of terminal B becomes the input laser beam 21 of terminal A.

The terminal A preferably includes a microprocessor 11 operating under stored program control. The terminal A also includes a transmitter comprising a laser radiation source 12, and a receiver comprising a photodetector 13. The microprocessor 11 is connected to the laser 12 and photodetector 13 by conventional input- /output (I/O) methods. For example, either data bus attached or memory mapped I/O hardware may be used. The laser 12 is controlled by an analog laser control circuit 14.

The analog laser control circuit 14 properly biases the laser 12 and regulates its optical power output, compensating for temperature, component aging, and other variations. The analog laser control circuit 14, in cooperation with the microprocessor 11, also modulates the laser output beam 15 with the desired information to be transmitted. The analog laser control circuit 14 interfaces to the microprocessor 11 through the digital I/O control and buffer circuit 16.

The digital I/O control and buffer circuit 16 buffers an entire packet of data from the microprocessor 11. The buffer is then emptied and the data is modulated onto the output laser beam 15. As shown in the illustrated embodiment, the microprocessor 11 may be connected to a data terminal 16 which communicates with a corresponding remotely positioned data terminal via the laser communication system 10. As would be readily understood by those skilled in the art, other types of communications traffic may also be carried by the laser communication system 10.

The microprocessor 11 also controls the safety-related and other functions for the terminal A. For example, the microprocessor periodically inserts the terminal's identification code into the data stream to be modulated onto the output beam 15. The identification code is recognized by the remotely positioned terminal B. Laser power and duty cycle are also controlled by the microprocessor 11. A conventional "dead man" circuit, as used in laser scanning systems, may preferably be included in the laser control circuit 14 to turn off the laser transmitter 12 if it is determined that the microprocessor 11 has malfunctioned.

A collecting lens 20 collects the input laser beam 21 from the remotely positioned terminal B. The photodetector 13 is positioned at the focal point of the collecting lens 20. The collecting lens 20 may also include an opening at the center thereof to permit mounting of the laser transmitter housing 22 and its associated beam shaping lens 23.

The photodetector 13 feeds the signal from the input beam 21 to an amplifier and threshold circuit 24. As would be readily understood by those skilled in the art, the amplifier and threshold circuit 24 is of conventional design, such as typically included in photo-electronic systems. The amplifier and threshold circuit 24 may include an automatic gain control circuit, or the gain may be digitally controlled by the microprocessor 11. The threshold circuit converts the analog signal from the photodetector 13 to a digital pulse stream. The threshold circuit also preferably implements a lockout criteria that reduces the digitization of noise.

The digital signal from the amplifier and threshold circuit 24 is fed to a digital buffer in the digital I/O control and buffer circuit 16. When the buffer is filled, an interrupt is sent to the microprocessor 11 which then retrieves the contents of the buffer. Thus, the microprocessor 11 operates on large blocks of data.

The laser communication system 10 according to the invention provides a safe stationary laser beam. A sufficiently high power laser beam may produce irreparable eye damage without the observer being aware of the exposure, such as by sensing pain. Accordingly, stationary laser systems must meet industry Class 1 limits. As is readily understood by those skilled in the art, the Class 1 limits for stationary laser beams are significantly lower than corresponding limits for moving beams because a moving beam will put less energy into the eye of an accidental observer over a given period of time than a stationary beam.

The stationary beam exposure limits may be met by the present invention by pulsing the laser transmitter 12 at a low duty cycle whenever the output laser beam 15 may be blocked or misaligned. The microprocessor 11 controls the duty cycle of the laser transmitter 12.

The communications terminal A includes detector means, cooperating with the receiver, for detecting a blockage or misalignment of the output beam 15 based upon the input beam 21. The blockage or misalignment of the output beam 15 is indicated if the remotely positioned terminal B fails to properly receive the output beam 15. The remotely positioned terminal B produces a confirmation signal periodically modulated onto the input beam 21 in the information data stream. A blockage or misalignment of the output beam 15 will cause the confirmation signal to stop being sent. A blockage or misalignment of the output beam 15 indicates that the beam may be directed to the eyes of an accidental or unintended observer.

The detector means preferably includes means for recognizing the confirmation signal. If the confirmation signal is not detected for a predetermined time, a blockage or misalignment of the output beam 15 is indicated. As would be readily understood by those skilled in the art a common blockage of both the input beam 21 and output beam 15, or a blockage or misalignment of the input beam 21 will also cause the confirmation signal to be absent. In the interest of safety, the laser communication system 10 of the invention requires positive confirmation that the output beam 15 is being received at the remotely positioned terminal B before operation at the high power level is permitted.

Safety control means cooperates with the detector means to operate the laser 12 so that the output beam 15 is below the safety threshold if the confirmation signal is not received for a predetermined time. During normal operation, when a blockage or misalignment of the output beam 21 is not detected, the laser transmitter 12 may be operated at a higher power level to improve overall communication performance. The terminal A also include means for generating a second or output confirmation signal to be sent to the remotely positioned terminal B when the input beam 21 is being properly received. As would be readily understood by those skilled in the art, the detector means, safety control means, and confirmation signal generating means may be implemented by the microprocessor 11 operating under stored program control, or alternately may be analog or digital circuits. Thus, the microprocessor 11, or discrete circuits, may provide a confirmation signal responsive safety controlling means that is responsive to the absence of a confirmation signal in the received input laser beam 21 for operating the transmitter 12 below a safety threshold, to thereby protect the eyes of an accidental observer.

Figure 2:
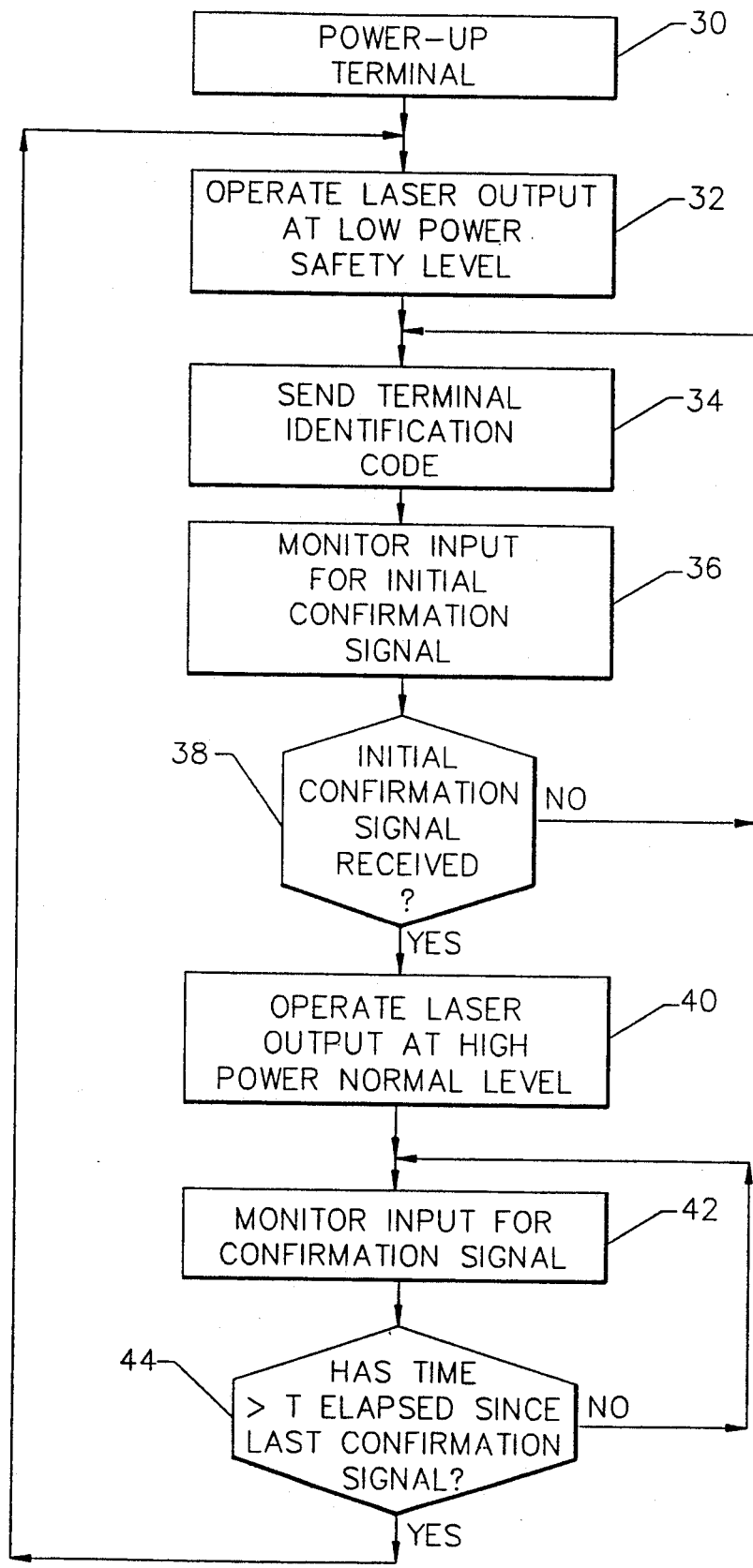
FIG. 2 is a flowchart illustrating a method of operation of the laser communication system as shown in FIG. 1.

Referring to FIG. 2, there is shown a flowchart illustrating the operation of the laser communication system 10. When the terminal A is first powered-up (Block 30), the laser 12 is operated at a low power safety level so that the output beam 15 is below the Class 1 safety threshold (Block 32). At Block 34, the microprocessor 11 generates a unique terminal identification code which is transmitted on the output beam 15. The data On the input beam 21 is then monitored for an initial confirmation signal, such as a predetermined digital code, indicating that the remotely positioned terminal B has received the output beam 15 (Block 38). If the confirmation signal has not been received (Block 38), the microprocessor 11 again sends the terminal identification code at Block 34 at the low power safety level and monitors for the initial confirmation signal (Block 36).

Once the initial confirmation signal is received at Block 38, the microprocessor 11 then operates the laser 12 at the high power normal level (Block 40). While the system 10 is operating at the high power level, the system 10 operating performance is enhanced. For example, the system 10 may operate at a higher signal-to-noise ratio, the bit rate may be increased, or a combination of these may be achieved.

At Block 42, the microprocessor 11 monitors the received data signal for the confirmation signal. At Block 44, if the confirmation signal is absent for a time greater than T, then the laser 12 is again operated at the low power safety level (Block 32). The absence of the confirmation signal indicates a blockage or misalignment of the output beam 15. The time T is determined by the allowable exposure time, based on the laser power, from Class 1 laser standards. As would be readily understood by those skilled in the art, other laser limits may be applicable in other geographic areas, and new limits may be developed or determined. As would also be readily understood by those skilled in the art, the communication system 10 according to the invention may be readily adapted to comply with other laser emission limits.

Figure 3:
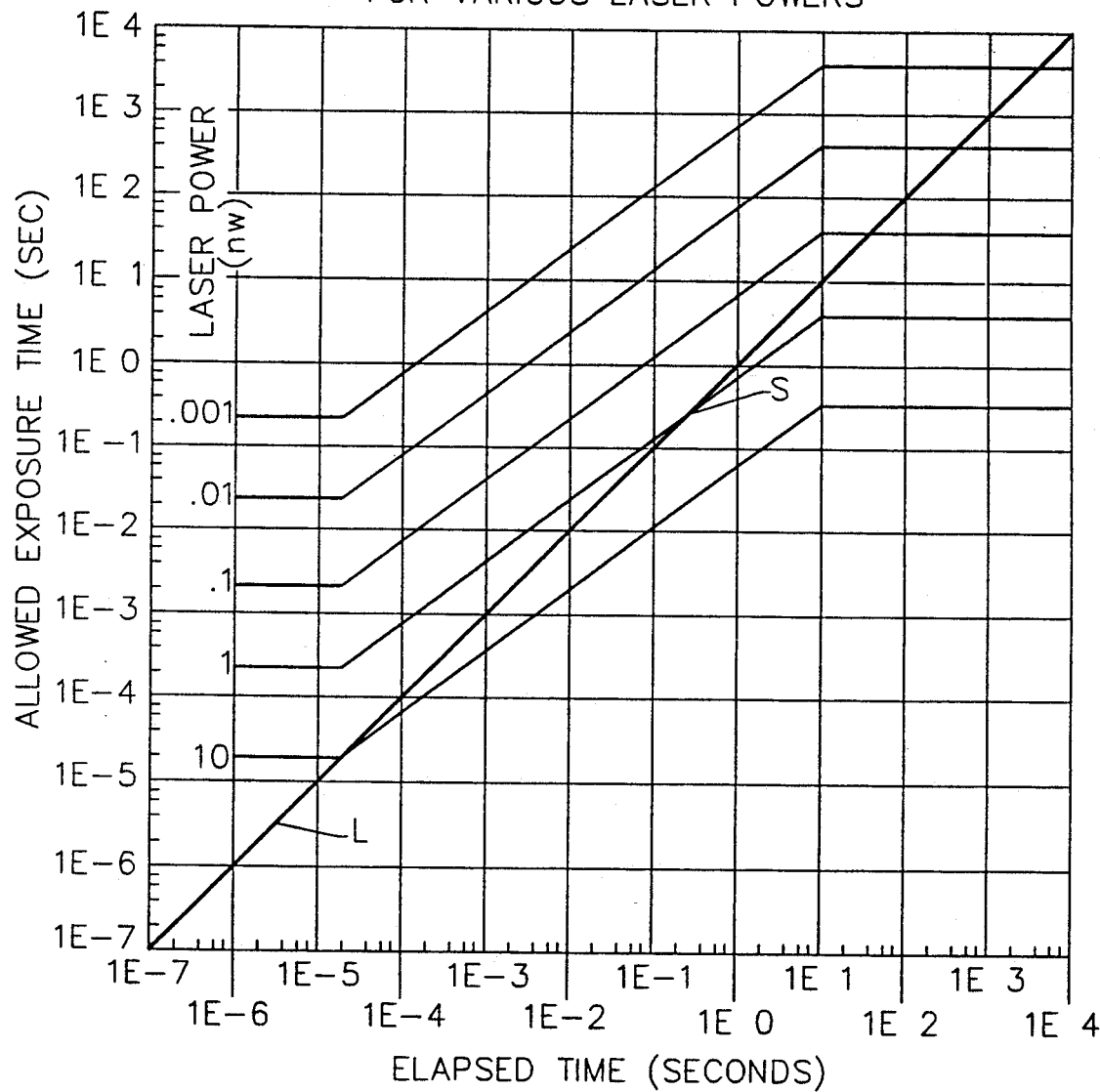
FIG. 3 is a graph showing Class 1 exposure time limits for various laser powers.

Referring to the graph of FIG. 3, there are shown several plots of allowed exposure time (Y-axis) versus the elapsed time of exposure (X-axis) for various power laser beams. The laser powers vary from 0.001 milliwatts to 10 milliwatts as shown. The limit L is indicated by the straight line extending diagonally across the graph. Class 1 safety limits are complied with if the laser power and elapsed time are above the line. If the laser power and elapsed time are below the Class 1 limits, then the beam is not safe.

For example, the Class 1 limit is exceed for a 1 milliwatt laser after the beam has been operating for more than about 240 milliseconds as shown by point S on the graph. As may also be seen in the graph, a laser operating at 0.001 milliwatt approaches inherent safety. The laser communication system 10 controls the laser transmitter 12 so that the power of the output beam 15 is maintained below the safety level threshold when a blockage or misalignment of the beam is detected. At all other times during normal operation, the laser transmitter 12 may be operated at a higher average power level to improve system 10 performance.

The laser communication system 10 includes the confirmation signal within the communication data stream. Accordingly, it requires no additional major components other than those necessary without the safety features and enhanced performance of the present invention. Thus, the laser communication system 10 is relatively simple, yet highly reliable. As would be readily understood by those skilled in the art, an existing laser communication system may retrofitted with a safety controller which is capable of causing the laser to operate at a low power safety level and normal high power level as described above, particularly with reference to the flowchart of FIG. 2 and the associated description.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A laser communication terminal for free space communications with a corresponding remotely positioned terminal, said laser communication terminal comprising:
   a transmitter including means for generating and coupling a stationary output laser beam into free space;
   a receiver including means for collecting a stationary input laser beam from free space;
   detector means, cooperating with said receiver, for detecting blockage or misalignment of the stationary output laser beam into free space based upon the stationary input laser beam collected from free space; and
   safety control means, cooperating with said transmitter and responsive to said detector means, for operating said transmitter above a predetermined average power level corresponding to a safe exposure level and exposure time for an accidental observer of the stationary output laser beam during normal operation when no blockage or misalignment of the stationary output laser beam is detected to thereby provide enhanced communication performance for the laser communication terminal, said safety control means further for operating the transmitter below the predetermined average power level corresponding to the safe exposure level and exposure time for an accidental observer when a blockage or misalignment of the stationary output laser beam is detected to thereby protect the eyes of an accidental observer.

2. The laser communication terminal according to claim 1 wherein said detector means includes means for recognizing a confirmation signal in the input laser beam.

3. The laser communication terminal according to claim 2 wherein said detector means detects a blockage or misalignment of the output laser beam responsive to an absence of said confirmation signal for a predetermined time.

4. The laser communication terminal according to claim 1 wherein said safety control means includes means for controlling the duty cycle of said transmitter to thereby control the average power of the output laser beam.

5. The laser communication terminal according to claim 1 wherein said safety control means includes means for generating a second confirmation signal in the output laser beam.

6. The laser communication terminal according to claim 1 further comprising a lens for collecting the input laser beam, wherein said receiver includes a photodetector, and wherein said photodetector is positioned at the focal point of said lens.

7. The laser communication terminal according to claim 6 wherein said lens includes an opening therein axially aligned with said photodetector, wherein said transmitter includes a laser radiation source, and wherein said laser radiation source is positioned in said lens opening.

8. A free space laser communication system comprising:
- a first terminal and a second terminal in spaced-apart relation, each of said terminals comprising a laser transmitter including means for generating and coupling a stationary output laser beam into free space and a laser receiver including means for collecting a stationary input laser beam from free space, said first terminal for transmitting a first stationary laser beam through free space to said second terminal, said second terminal for transmitting a second stationary laser beam through free space to said first terminal;
- said first terminal further comprising means responsive to the first receiver, for generating a confirmation signal to the first laser beam when the second laser beam is being received by said first receiver;
- said second terminal further comprising:
  - detector means cooperating with the second receiver for determining an absence of said confirmation signal in the first stationary laser beam to detect a blockage or misalignment of the second stationary laser beam into free space; and
  - safety control means, cooperating with the second transmitter and responsive to said detector means, for operating the second transmitter above a predetermined average power level corresponding to a safe exposure level and exposure time for an accidental observer of the second stationary laser beam during normal operation when no blockage or misalignment of the second stationary laser beam is detected to thereby provide enhanced communication performance for the laser communication system, said safety control means further for operating the transmitter below the predetermined average power level corresponding to the safe exposure level and exposure time for an accidental observer when a blockage or misalignment of the second stationary laser beam is detected to thereby protect the eyes of an accidental observer.

9. The laser communication system according to claim 8 wherein said safety control means operates the second transmitter below the safety threshold responsive to an absence of said confirmation signal for a predetermined time.

10. The laser communication system according to claim 8 wherein said safety control means of said second terminal includes means operatively connected to the second transmitter for controlling the duty cycle thereof, to thereby control the average power of the second laser beam.

11. The laser communication system according to claim 8 wherein the receiver of each terminal includes a laser detector, wherein each of said terminals further comprises a lens for collecting the respective laser beam from the opposite terminal, and wherein said laser detectors are positioned at the focal point of the respective lenses.

12. The laser communication system according to claim 11 wherein the transmitter of each terminal includes a laser radiation source, wherein each of said lenses includes an opening therein axially aligned with a respective laser detector, and wherein said laser radiation sources are positioned in respective lens openings.

* * * * *